United States Patent
Chung et al.

(10) Patent No.: US 9,596,394 B2
(45) Date of Patent: Mar. 14, 2017

(54) CAMERA AND LENS MODULE

(71) Applicant: SAMSUNG ELECTRONICS CO., LTD., Suwon-si (KR)

(72) Inventors: Hae-In Chung, Anyang-si (KR); Jin-won Lee, Seongnam-si (KR); Jong-chul Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/978,420

(22) Filed: Dec. 22, 2015

(65) Prior Publication Data

US 2016/0212312 A1    Jul. 21, 2016

(30) Foreign Application Priority Data

Jan. 16, 2015  (KR) .................. 10-2015-0008097

(51) Int. Cl.
*H04N 5/225* (2006.01)
*G02B 7/04* (2006.01)
(Continued)

(52) U.S. Cl.
CPC ............ *H04N 5/2254* (2013.01); *G02B 7/04* (2013.01); *G02B 7/08* (2013.01); *G02B 27/646* (2013.01);
(Continued)

(58) Field of Classification Search
CPC ............ H04N 5/2254; H04N 5/23287; H04N 5/2252; H04N 5/2253; H04N 5/23248;
(Continued)

(56) References Cited

U.S. PATENT DOCUMENTS 7,146,097 B2 * 12/2006 Kameyama ............ G02B 7/08
                                                      359/824
7,570,880 B2    8/2009 Yoon et al.
(Continued)

FOREIGN PATENT DOCUMENTS

JP          5292529 B2    9/2013
JP       2014-10287 A    1/2014
(Continued)

OTHER PUBLICATIONS

International Search Report dated Feb. 24, 2016, issued by International Searching Authority in corresponding International Application No. PCT/KR2015/014146. (PCT/ISA/210).
(Continued)

*Primary Examiner* — Aung S Moe
(74) *Attorney, Agent, or Firm* — Sughrue Mion, PLLC

(57) ABSTRACT

A camera and a lens module are provided. The camera includes a lens module and an image sensor. The lens module includes a lens unit including a protrusion, the lens unit being configured to move in a direction of an optical axis of the camera. The lens module further includes a movement guide including an inclination part, the protrusion being configured to slide along the inclination part while the lens unit moves in the direction of the optical axis. The lens module further includes a driver configured to drive the lens unit in the direction of the optical axis, and a pre-loader configured to provide a pre-load between the lens unit and the movement guide in the direction of the optical axis.

20 Claims, 23 Drawing Sheets

(51) Int. Cl.
  *H04N 5/232* (2006.01)
  *G02B 7/08* (2006.01)
  *G02B 27/64* (2006.01)

(52) U.S. Cl.
  CPC ......... *H04N 5/2252* (2013.01); *H04N 5/2253* (2013.01); *H04N 5/2257* (2013.01); *H04N 5/23248* (2013.01); *H04N 5/23287* (2013.01)

(58) Field of Classification Search
  CPC ...... H04N 5/2257; G02B 27/646; G02B 7/08; G02B 7/04
  See application file for complete search history.

(56) References Cited

U.S. PATENT DOCUMENTS

| | | | |
|---|---|---|---|
| 7,630,151 B2 * | 12/2009 | Fujita | ...................... G02B 7/08 359/822 |
| 7,936,527 B2 | 5/2011 | Shyu et al. | |
| 8,503,106 B2 | 8/2013 | Ko et al. | |
| 8,577,217 B2 | 11/2013 | Hu | |
| 2006/0044455 A1 | 3/2006 | Kim et al. | |
| 2006/0214520 A1 | 9/2006 | Tseng | |
| 2006/0257131 A1 | 11/2006 | Yoon et al. | |
| 2009/0040361 A1 | 2/2009 | Heim et al. | |
| 2010/0238307 A1 * | 9/2010 | Lee | .......................... G03B 5/00 348/208.7 |
| 2012/0092551 A1 | 4/2012 | Ohishi et al. | |
| 2013/0107380 A1 * | 5/2013 | Miura | ...................... G03B 5/02 359/814 |
| 2014/0362284 A1 | 12/2014 | Shin et al. | |
| 2016/0025995 A1 * | 1/2016 | Ariji | ........................ G02B 7/08 359/557 |
| 2016/0050351 A1 * | 2/2016 | Lee | ..................... H04N 5/2252 348/221.1 |

FOREIGN PATENT DOCUMENTS

| | | |
|---|---|---|
| KR | 10-0550907 B1 | 2/2006 |
| KR | 10-2006-0117141 A | 11/2006 |
| KR | 10-1148599 B1 | 5/2012 |
| KR | 10-2013-0059576 A | 6/2013 |
| WO | 2010/021492 A2 | 2/2010 |

OTHER PUBLICATIONS

Written Opinion dated Feb. 24, 2016, issued by International Searching Authority in corresponding International Application No. PCT/KR2015/014146. ( PCT/ISA/237).

* cited by examiner

CAMERA AND LENS MODULE

CROSS-REFERENCE TO RELATED APPLICATION

This application claims priority from Korean Patent Application No. 10-2015-0008097, filed on Jan. 16, 2015, in the Korean Intellectual Property Office, the disclosure of which is incorporated herein by reference in its entirety.

BACKGROUND

1. Field

Apparatuses and methods consistent with exemplary embodiments relate to a camera and a lens module, and more particularly, to a camera and a lens module minimizing a tilt occurring while using a camera.

2. Description of the Related Art

As cameras and electronic devices provided with cameras are increasingly used in recent years, users' demands for portable and light cameras increase. A size of a camera may be reduced to meet the users' demands, and thus a thin lens is increasingly used to reduce the size of the camera or the lens module used in cameras.

However, when an auto focusing function is used and the thin lens is driven, image capturing by the camera provided with the thin lens may more seriously suffer from negative effects due to a tilt than in a general lens. When the tilt occurs while a subject is being photographed by the user, it is difficult to photograph an image as the user desires, and the quality of the photographed image may deteriorate. Therefore, there is a demand for a method for reducing a tilt of a lens, i.e., a thin lens.

SUMMARY

Exemplary embodiments address at least the above problems and/or disadvantages and other disadvantages not described above. Also, one or more exemplary embodiments are not required to overcome the disadvantages described above, and an exemplary embodiment may not overcome any of the problems described above.

Aspects of one or more exemplary embodiments provide a camera and a lens module minimizing a tilt occurring while a user uses a camera.

According to an aspect of an exemplary embodiment, a camera includes a lens module and an image sensor. The lens module includes a lens unit including a protrusion, the lens unit being configured to move in a direction of an optical axis of the camera. The lens module further includes a movement guide including an inclination part, the protrusion being configured to slide along the inclination part while the lens unit moves in the direction of the optical axis. The lens module further includes a driver configured to drive the lens unit in the direction of the optical axis, and a pre-loader configured to provide a pre-load between the lens unit and the movement guide in the direction of the optical axis.

The pre-loader may include a first yoke portion disposed on the lens unit, and a first magnet portion disposed on the movement guide, and the pre-loader may be configured to provide the pre-load between the lens unit and the movement guide by a magnetic force of the first yoke portion and the first magnet portion.

The camera may further include an image sensor holder including the image sensor and a second yoke portion, and the pre-loader may be further configured to provide a pre-load between the movement guide and the image sensor holder by a magnetic force of the first magnet portion and the second yoke portion.

The image sensor holder may further include a first coil portion, and the driver may be further configured to drive the movement guide to perform a translational motion with respect to the image sensor holder by an electromagnetic force of the first coil portion and the first magnet portion.

The lens unit may further include a second magnet portion, the image sensor holder may further include a second coil portion, and the driver may be configured to drive the lens unit to perform a rotational motion in the direction of the optical axis by an electromagnetic force of the second coil portion and the second magnet portion.

The lens unit may further include a cylindrical housing including a lens, the second magnet portion may be disposed on a side surface of the cylindrical housing, the image sensor holder may have a cylindrical shape, and the second coil portion may be disposed on a side surface of the image sensor holder, the second coil portion being engaged with the second magnet portion, and the image sensor holder being connected with the lens unit.

The protrusion may be disposed on a surface contacting the movement guide among surfaces of the lens unit, and the inclination part may be disposed on a surface contacting the lens unit among surfaces of the movement guide.

The protrusion may be in contact with the inclination part while the lens unit and the movement guide are provided the pre-load and while the lens unit moves in the direction of the optical axis.

The lens unit may include protrusions disposed on a surface contacting the movement guide, among surfaces of the lens unit, at symmetrically spaced units, and the movement guide may include inclination parts disposed on a surface contacting the lens unit, among surfaces of the movement guide, at locations corresponding to locations of the protrusions at symmetrically spaced units.

The lens unit may be configured to move in the direction of the optical axis to adjust a focal point of the camera while the camera is performing auto focusing.

The movement guide may include a lens, the movement guide being configured to perform a translational motion with respect to the image sensor holder while the camera is performing hand shaking prevention.

The lens unit may include a lens having a ratio of a diameter to a height that is greater than or equal to a value.

According to an aspect of another exemplary embodiment, a lens module includes a lens unit including a protrusion and a yoke portion, the lens unit being configured to move in a direction of an optical axis of the lens module. The lens module further includes a movement guide including an inclination part, the protrusion being configured to slide along the inclination part while the lens unit moves in the direction of the optical axis. The movement guide further includes a magnet portion connected with the yoke portion.

The inclination part may be configured to protrude from a portion of a surface of the movement guide, and may have an inclined shape with respect to the surface from which the inclination part protrudes.

The yoke portion may include yokes disposed on a surface contacting the movement guide among surfaces of the lens unit, and the magnet portion may include magnets disposed on a surface opposite to a surface contacting the lens unit among surfaces of the movement guide, the magnets being disposed at locations corresponding to locations of the yokes.

According to an aspect of another exemplary embodiment, a camera includes a lens unit including a protrusion and a first yoke portion, the lens unit being configured to move in a direction of an optical axis of the camera. The camera further includes a movement guide including an inclination part, the protrusion being configured to slide along the inclination part while the lens unit moves in the direction of the optical axis. The movement guide further includes a first magnet portion connected with the first yoke portion. The camera further includes an image sensor holder including an image sensor, and a second yoke portion connected with the first magnet portion.

The image sensor holder may further include a first coil portion connected with the first magnet portion.

The lens unit may further include a second magnet portion, and the image sensor holder may further include a second coil portion connected with the second magnet portion.

The camera may further include a driver configured to drive the movement guide to perform a translational motion with respect to the image sensor holder by an electromagnetic force of the first coil portion and the first magnet portion, and drive the lens unit to perform a rotational motion in the direction of the optical axis by an electromagnetic force of the second coil portion and the second magnet portion.

The image sensor, the second yoke portion, and the first coil portion may be disposed on a surface contacting the movement guide among surfaces of the image sensor holder.

BRIEF DESCRIPTION OF THE DRAWINGS

The above and/or other aspects will be more apparent by describing exemplary embodiments with reference to the accompanying drawings, in which.

DETAILED DESCRIPTION OF THE EXEMPLARY EMBODIMENTS

Figure 1:
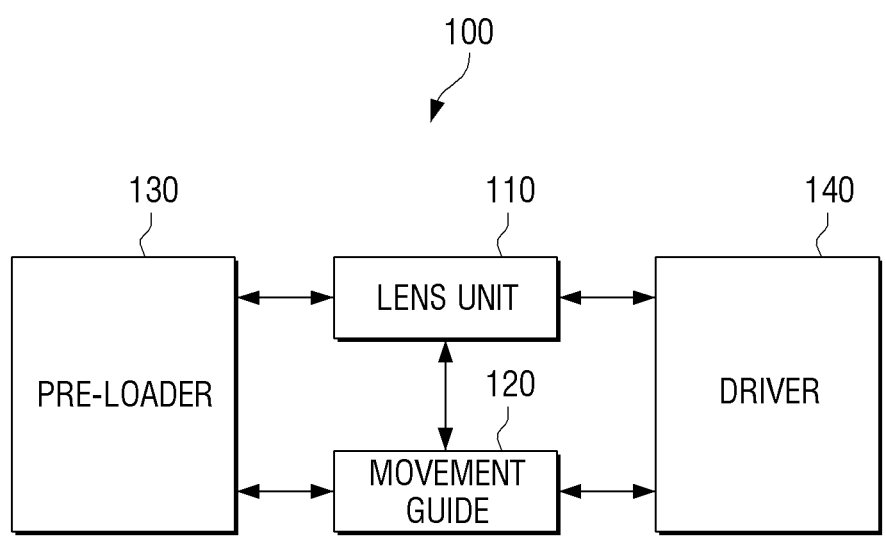
FIG. 1 is a block diagram showing a configuration of a lens module, according to an exemplary embodiment.

Exemplary embodiments are described in greater detail with reference to the accompanying drawings.

Although the exemplary embodiments are illustrated in the drawings and relevant detailed descriptions are provided, various changes can be made and one or more exemplary embodiments may be provided. Accordingly, one or more exemplary embodiments are not limited to the exemplary embodiments, and may be construed as including all changes, equivalents or substitutes included in the ideas and technological scopes of the exemplary embodiments. In the following description, detailed descriptions of well-known functions or configurations will be omitted because they would unnecessarily obscure the subject matters of the exemplary embodiments.

The terms such as "first" and "second" may be used to describe various elements, but the elements are not limited by these terms. These terms may be used for the purpose of distinguishing one element from another element.

The terms used in the exemplary embodiments are for the purpose of describing the exemplary embodiments only, and are not intended to limit one or more exemplary embodiments. As used herein, the singular forms are intended to include the plural forms as well, unless the context clearly indicates otherwise. In addition, it may be understood that the term "include" or "comprise" used in the exemplary embodiments is to indicate the presence of features, numbers, steps, operations, elements, parts, or a combination thereof described in the specification, and do not preclude the presence or addition of one or more other features, numbers, steps, operations, elements, parts, or a combination thereof.

A "module" or "unit" used in the exemplary embodiments performs at least one function or operation, and may be implemented by hardware, software, or a combination of hardware and software. In addition, a plurality of "modules" or a plurality of "units" may be integrated into at least one module, and may be implemented as at least one processor, except for a "module" or "unit" that is implemented by specific hardware.

FIG. 1 is a block diagram showing a configuration of a lens module 100, according to an exemplary embodiment. As shown in FIG. 1, the lens module 100 includes a lens unit 110, a movement guide 120, a pre-loader 130, and a driver 140.

The lens module 100 may be fixed or attachably or detachably mounted in an image photographing device such as a camera. In addition, the lens module 100 may be fixed or attachably or detachably mounted in a camera included in an electronic device such as a television (TV) or a mobile phone.

The lens unit 110 may include at least one lens, and may be a driving lens movable in a direction of an optical axis of the lens module 100 or camera. That is, when auto focusing is performed while an image is being photographed, the lens unit 110 may move in the direction of the optical axis to adjust a focal point. In addition, the lens unit 110 may include at least one protrusion. The protrusion included in the lens unit 110 will be explained in detail below.

The lens unit 110 may be implemented using a thin lens, the thickness of which is thinner than a threshold thickness. Therefore, the lens unit 110 may include at least one protrusion formed on one surface contacting the movement guide 120 among the plurality of surfaces of the lens unit 110. For example, the lens unit 110 may include three protrusions formed on one surface contacting the movement guide 120 at intervals of 120 degrees. Also, the lens may have a ratio of a diameter to a height that is greater than or equal to a threshold value.

The movement guide 120 may include at least one lens. In addition, the movement guide 120 includes an inclination part that the at least one protrusion of the lens unit 110 moves in contact with when the lens unit 110 moves in the optical axis direction. That is, the movement guide 120 may include a protruding inclination part. The inclination part may be formed on one surface contacting the lens unit 110 among the plurality of surfaces of the movement guide 120.

For example, the movement guide 120 may include three inclination parts arranged on one surface contacting the lens unit 110 at intervals of 120 degrees to correspond to the three protrusions of the lens unit 110. Therefore, the inclination parts included in the movement guide 120 may maintain contact with the protrusions of the lens unit 110 before the lens unit 110 is driven and while the lens unit 110 is being driven.

That is, the height of the protrusion and of the inclination part may determine the drivable range of the lens unit 110. Therefore, as the height of the protrusion and of the inclination part increases, the drivable range of the lens unit 110 may correspondingly increase.

The pre-loader 130 is an element for providing pre-load between the lens unit 110 and the movement guide 120 in the optical axis direction. That is, the pre-load of the pre-loader 130 in the optical axis direction may prevent a tilt from occurring between the lens unit 110 and the movement guide 120 before a function, such as an auto focusing function, is used.

The pre-loader 130 may be implemented using a first yoke portion included in the lens unit 110 and a first magnet portion included in the movement guide 120. That is, the pre-loader 130 may provide pre-load between the lens unit 110 and the movement guide 120 by the magnetic force of the first yoke portion and the first magnet portion.

The pre-loader 130 may provide pre-load between an image sensor holder including an image sensor and the movement guide 120. The image sensor holder may include a second yoke portion and a first coil portion. Accordingly, the pre-loader 130 may provide pre-load between the movement guide 120 and the image sensor holder by the magnetic force of the first magnet portion included in the movement guide 120 and the second yoke portion included in the image sensor holder.

The driver 140 is an element for driving to move at least one of the lens unit 110 and the movement guide 120 in the optical axis direction. The driver 140 may drive at least one of the lens unit 110 and the movement guide 120 in the optical axis direction by rotational motion, using the electromagnetic force generated between the first magnet and the first coil. Alternatively, the driver 140 may drive the lens unit 110 or the movement guide 120 to perform the translational motion with respect to the image sensor holder.

The driver 140 may drive the movement guide 120 to prevent hand shaking from occurring while an image is being photographed. That is, the driver 140 may drive the movement guide 120 to perform the translational motion by the electromagnetic force generated between the first coil portion included in the image sensor holder and the first magnet portion included in the movement guide 120.

In addition, the driver 140 may drive the lens unit 110 while performing a function such as an auto focusing function. The lens unit 110 that is formed in a cylindrical shape may include a second magnet portion formed on a side surface thereof. In addition, the image sensor holder that is formed in a cylindrical shape may include a second coil portion formed on a side surface thereof. Accordingly, the driver 140 may drive the lens unit 110 in the optical axis direction by the rotational motion that is made by the electromagnetic force generated between the second coil portion included in the image sensor holder and the second magnet portion included in the lens unit 110. The driver 140 may drive the lens unit 110 to perform the translational motion with respect to the image sensor holder.

The user can use a camera reducing the tilt, using the lens module 100 described above.

Figure 2A:
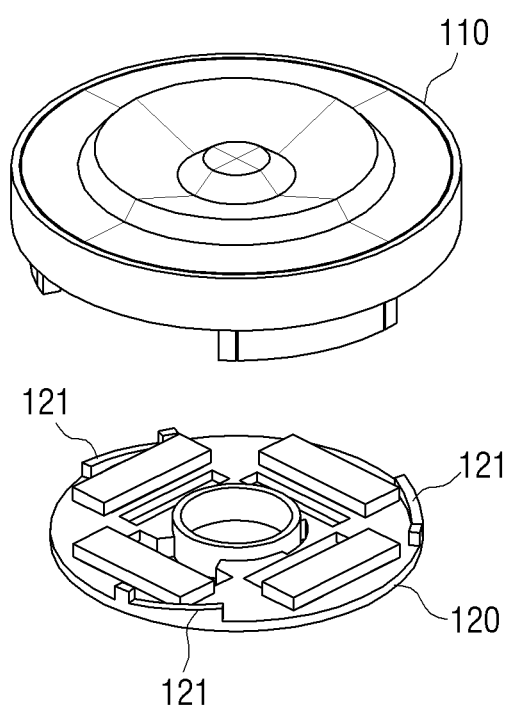
FIGS. 2A, 2B, and 2C are views showing a connection configuration of a lens unit and a movement guide, according to an exemplary embodiment.
Figure 2B:
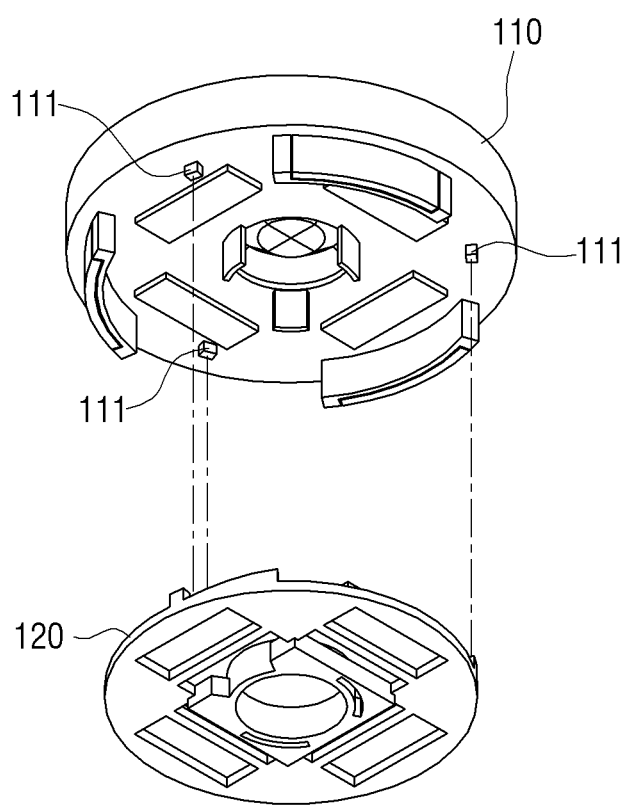
Figure 2C:
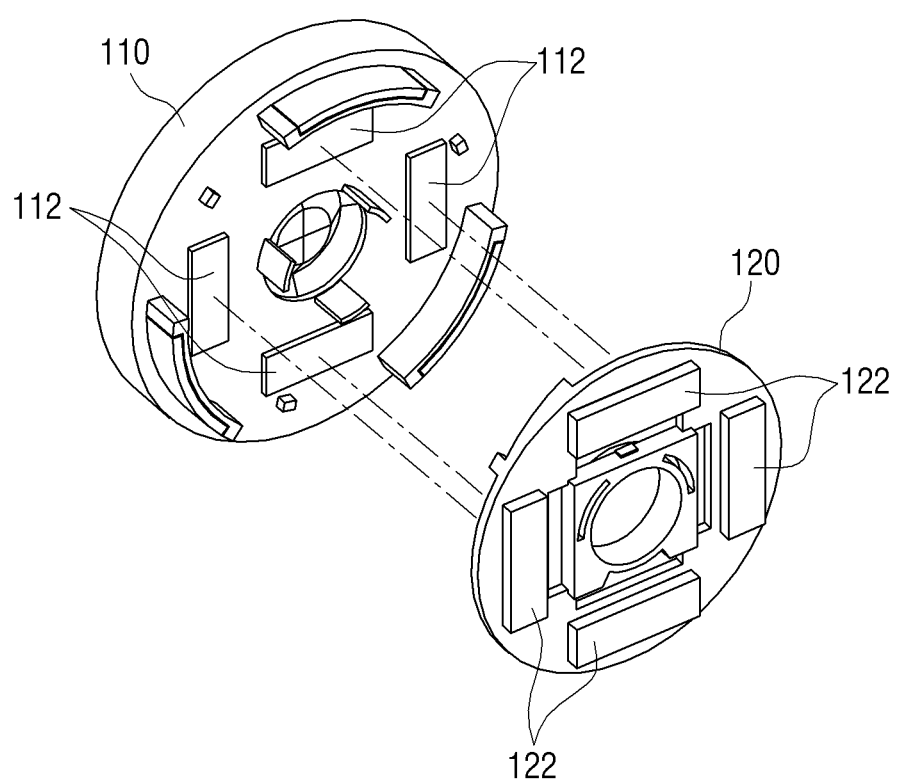

FIGS. 2A, 2B, and 2C are views showing a connection configuration of the lens unit 110 and the movement guide 120, according to an exemplary embodiment. In the following description, the lens unit 110 and the movement guide 120 include three protrusions and three inclination parts, respectively, which are arranged at intervals of 120 degrees. However, this is an example, and the lens unit 110 and the movement guide 120 may include one or more protrusions and one or more inclination parts, respectively.

As shown in FIG. 2A, the movement guide 120 includes inclination parts 121 formed on the surface contacting the lens unit 110. The inclination parts 121 may be arranged at intervals of 120 degrees. The inclination part 121 protrudes from a portion of one surface of the movement guide 120, has one end higher than the other end, and thus is formed in an inclined shape with respect to a relatively flat shape of the surface of the movement guide 120 from which the inclination part protrudes.

As shown in FIG. 2B, the lens unit 110 includes protrusions 111 formed on the surface contacting the movement guide 120. The protrusions 111 may be arranged at intervals of 120 degrees. The protrusions 111 are disposed on locations corresponding to the inclination parts 121 of the movement guide 120. The protrusion 111 is disposed on a location to be, for example, initially engaged with the lower end of the inclination part 121.

In addition, the lens unit 110 and the movement guide 120 may include a magnet portion and a yoke portion to be provided with pre-load. That is, as shown in FIG. 2C, the lens unit 110 includes a yoke portion 112 including a plurality of yokes, i.e., magnetic yokes. In addition, the movement guide 110 may include a magnet portion 122 including a plurality of magnets disposed on locations corresponding to the plurality of yokes.

FIG. 2C illustrates four yokes included in the yoke portion 112 and four magnets included in the magnet portion 122. However, the number of yokes of the yoke portion 112 and the number of magnets of the magnet portion 122 may vary according to the size and shape of the lens unit 110 and the movement guide 120.

The lens unit 110 and the movement guide 120 are brought into contact with each other by the connection force of the yoke portion 112 and the magnet portion 122.

Figure 9A:
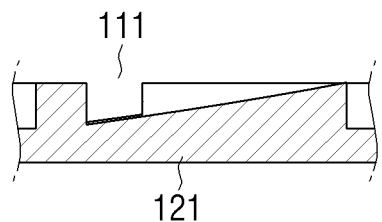
FIGS. 9A, 9B, and 9C are views showing a protrusion and an inclination part, according to exemplary embodiments.
Figure 9B:
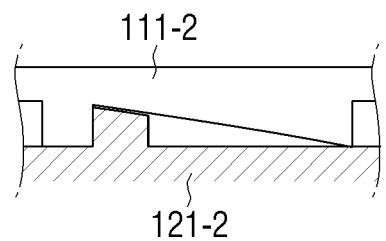
Figure 9C:
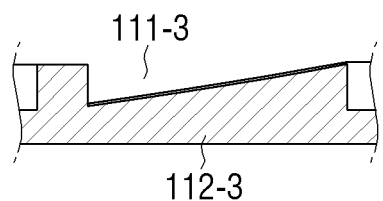

FIGS. 9A, 9B, and 9C are views showing a protrusion and an inclination part, according to exemplary embodiments. As shown in FIG. 9A, the lens unit 110 includes the protrusion 111, and the movement guide 120 includes the inclination part 121.

As shown in FIG. 9B, the lens unit 110 includes an inclination part 111-2, and the movement guide 120 includes a protrusion 121-2.

In addition, as shown in FIG. 9C, the lens unit 110 and the movement guide 120 include inclination parts 111-3 and 112-3, respectively. Accordingly, the inclination part 111-3 included in the lens unit 110 may slidably move along the inclination part 112-3 included in the movement guide 120 while the lens unit 110 is being driven.

Hereinafter, it is assumed that the lens unit 110 includes the protrusion 111 and the movement guide 120 includes the inclination part 121 as shown in FIG. 9A.

Figure 3A:
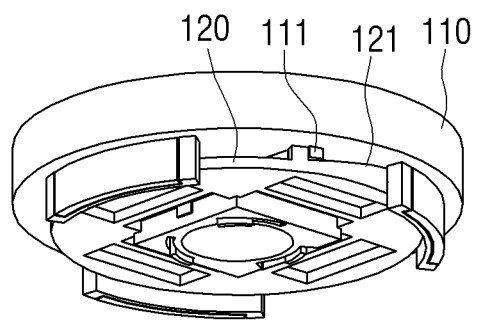
FIGS. 3A and 3B are views showing a connection configuration of a lens unit and a movement guide before the lens unit is driven, according to an exemplary embodiment.
Figure 3B:
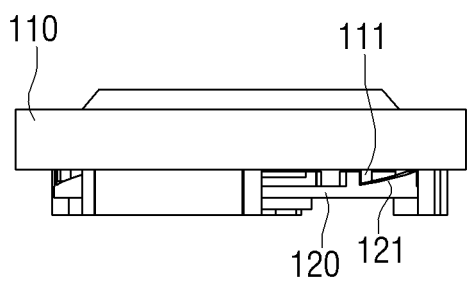

FIGS. 3A and 3B are views showing a connection configuration of the lens unit 110 and the movement guide 120 before the lens unit 110 is driven, according to an exemplary embodiment. That is, FIGS. 3A and 3B illustrate the lens unit 110 and the movement guide 120 that are subject to pre-load by the connection force of the yoke portion 112 and the magnet portion 122.

As shown in the drawings, the protrusion 111 included in the lens unit 110 is engaged with the lowest end of the inclination part 121 included in the movement guide 120. When three protrusions 111 and three inclination parts 121 are arranged at intervals of 120 degrees, the three pairs of the protrusions 111 and the inclination parts 121 may be engaged with each other on their respective locations as shown in FIGS. 3A and 3B.

However, the three protrusions 111 and the three inclination parts 121 is an exemplary embodiment. The lens unit 110 may include one or more protrusions 111, and the movement guide 120 may include one or more inclination parts 121.

Figure 4A:
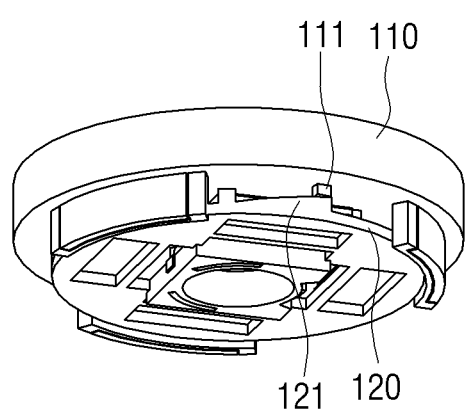
FIGS. 4A and 4B are views showing a connection configuration of a lens unit and a movement guide when the lens unit is driven, according to an exemplary embodiment.
Figure 4B:
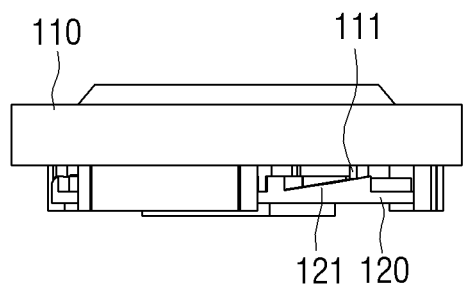

FIGS. 4A and 4B are views showing a connection configuration of the lens unit 110 and the movement guide 120 when the lens unit 110 is driven, according to an exemplary embodiment.

As described above, the lens unit 110 is driven in the optical axis direction by the rotational motion made by the electromagnetic force generated between the second magnet portion included in the side surface of the lens unit 110 and the second coil portion included in the side surface of the image sensor holder. When this occurs, as shown in FIGS. 4A and 4B, the protrusion 111 included in the lens unit 110 slides along the inclined surface of the inclination part 121 included in the movement guide 120.

When the three protrusions 111 and the three inclination parts 121 are arranged at intervals of 120 degrees, the three protrusions 111 may move along the inclined surfaces of the three inclination parts 121, respectively. Accordingly, the lens unit 110 performs the rotational motion with respect to the movement guide 120 in a spiral direction, thereby being driven without causing a tilt.

Figure 5A:
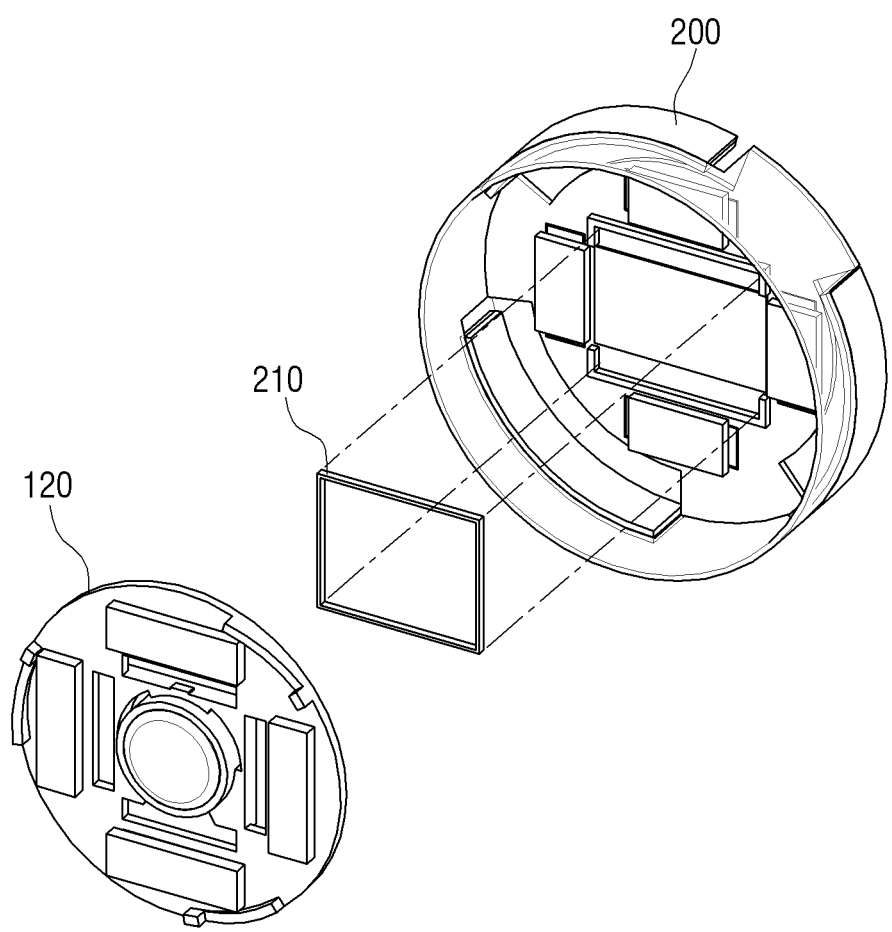
FIGS. 5A, 5B, and 5C are views showing a connection configuration of a movement guide and an image sensor holder, according to an exemplary embodiment.
Figure 5B:
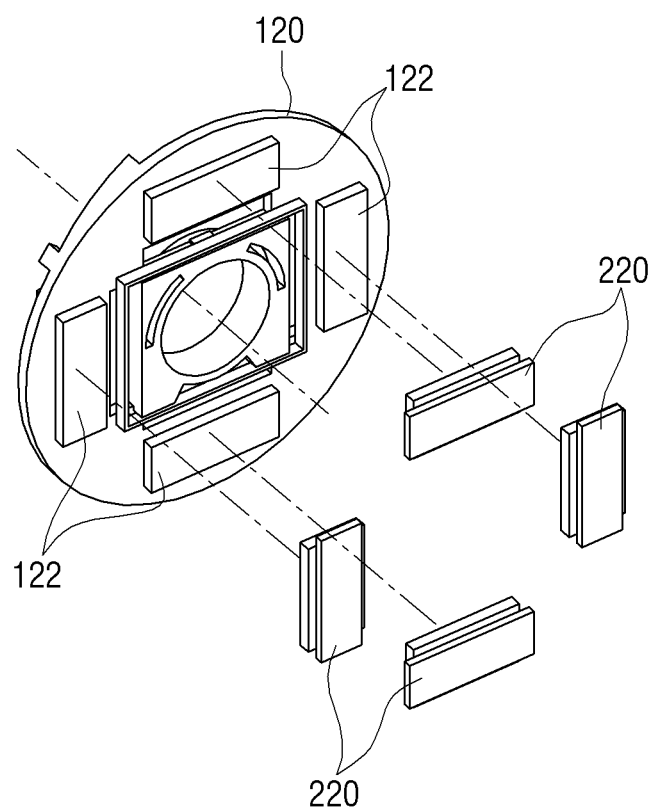
Figure 5C:
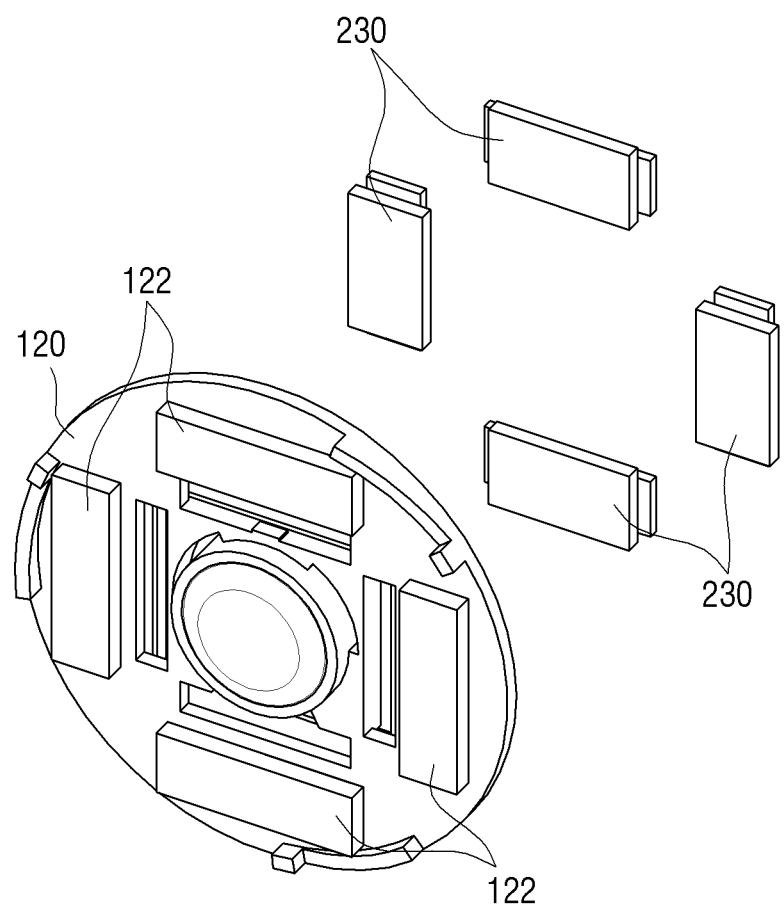

FIGS. 5A, 5B, and 5C are views showing a connection configuration of the movement guide 120 and an image sensor holder 200, according to an exemplary embodiment. As shown in FIG. 5A, the camera further includes the image sensor holder 200 including an image sensor. The image sensor holder 200 may be connected with the lens unit 110 and the movement guide 120 to be included in the lens module 110. In addition, the image sensor holder 200 may be implemented as a separate element from the lens unit 110 and the movement guide 120.

On the assumption that the optical axis direction of the image sensor holder 200 is a z-axis, the image sensor holder 200 includes an image sensor portion 210 movable in a direction of a y-axis and including an image sensor. In addition, the movement guide 120 is drivable in a direction of an x-axis.

The image sensor holder 200 may include a coil portion and a yoke portion. As shown in FIG. 5B, the image sensor holder 200 includes a yoke portion 220 to be connected with the first magnet portion 122 included in the movement guide 120. Although the yoke portion 220 is illustrated separately for the convenience of explanation in FIG. 5B, the yoke portion 220 may be formed on the surface of the image sensor holder 200 contacting the movement guide 120 among the plurality of surfaces of the image sensor holder 200. The yoke portion 220 included in the image sensor holder 200 includes a plurality of yokes, i.e., magnetic yokes, to correspond to the locations of the plurality of magnets included in the movement guide 120. Accordingly, the movement guide 120 and the image sensor holder 200 are subject to pre-load by the connection force of the first magnet portion 122 included in the movement guide 120 and the yoke portion 220 included in the image sensor holder 200, so that the tilt can be reduced.

As shown in FIG. 5C, the image sensor holder 200 includes a coil portion 230 including a plurality of coils. Although the coil portion 230 is illustrated separately for the convenience of explanation in FIG. 5C, the coil portion 230 may be formed on the surface of the image sensor holder 200 contacting the movement guide 120.

Accordingly, the movement guide 120 may perform the translational motion with respect to the image sensor holder 200 by the electromagnetic force generated between the coil portion 230 included in the image sensor holder 200 and the first magnet 122 included in the movement guide 120. For example, when a function, such as a hand shaking prevention function, is performed, the movement guide 120 may perform the translational motion with respect to the image sensor holder 200 by the electromagnetic force generated by the above-described elements.

Figure 6A:
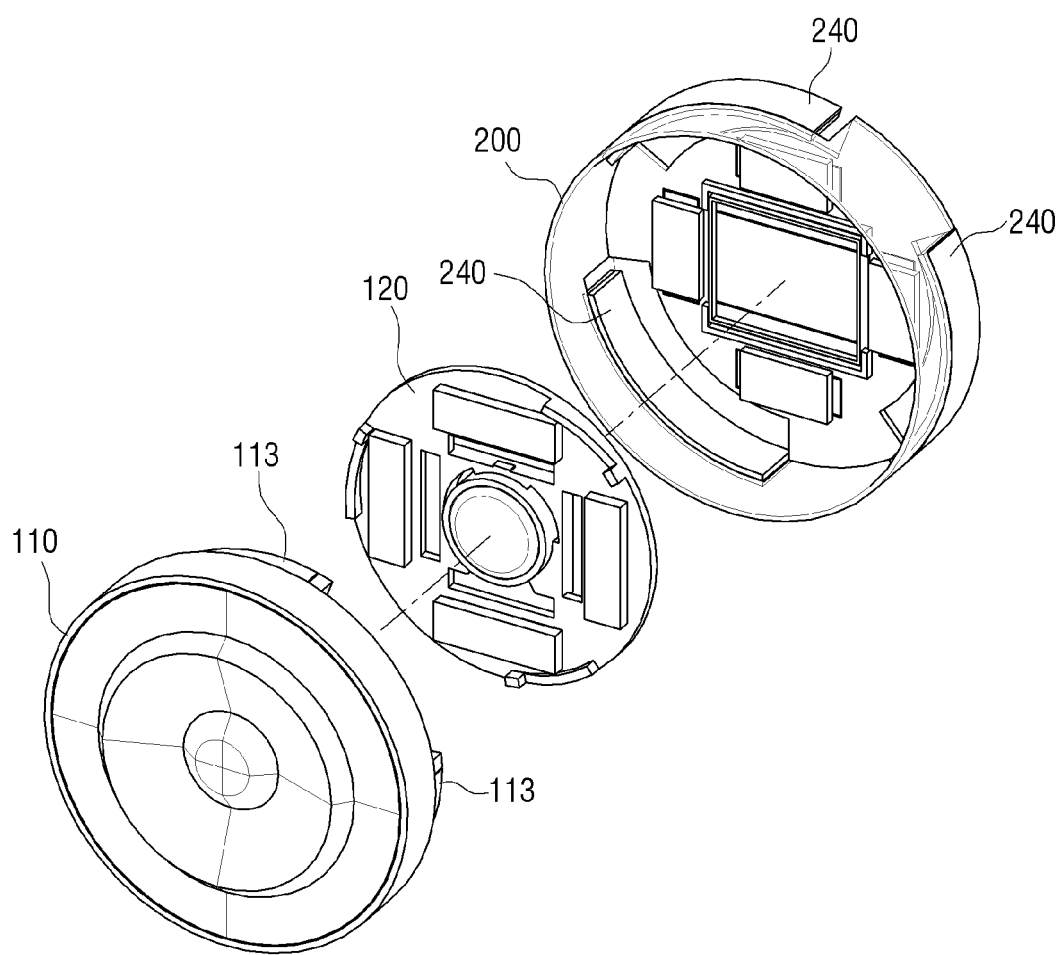
FIGS. 6A and 6B are views showing a connection configuration of a lens unit and an image sensor holder, according to an exemplary embodiment.
Figure 6B:
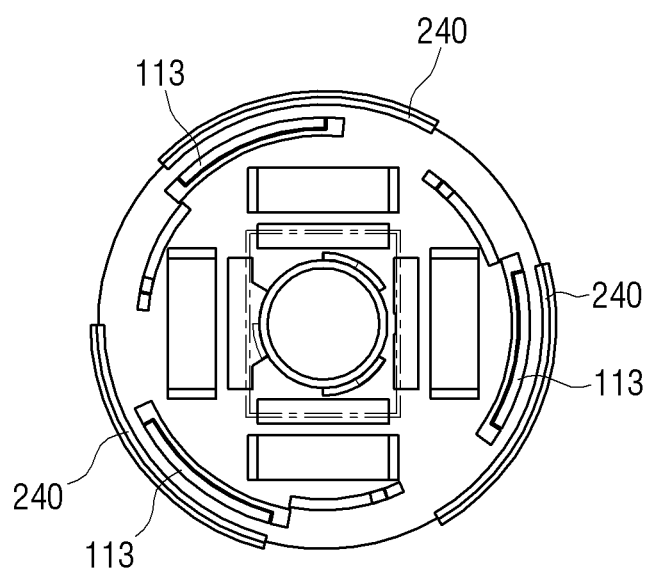

FIGS. 6A and 6B are views showing a connection configuration of the lens unit 110 and the image sensor holder 200, according to an exemplary embodiment.

As shown in FIG. 6A, the lens unit 110 includes a magnet portion 113 formed on the side surface thereof. The lens unit 110 may include at least one lens and a cylindrical housing. That is, the lens unit 110 may include the at least one magnet portion 113 formed on the side surface of the cylindrical housing.

For example, the magnet portion 113 of the lens unit 110 may include a plurality of magnets each having a predetermined size. That is, three magnets may be arranged on the side surface of the cylindrical lens unit 110 at predetermined intervals.

In addition, the image sensor holder 200 may also be implemented in a cylindrical shape. Accordingly, the image sensor holder 200 further includes a coil portion 240 formed on a location corresponding to the location of the magnet portion 113 of the lens unit 110.

As shown in FIG. 6B, the magnet portion 113 of the lens unit 110 and the coil portion 240 of the image sensor holder 200 are formed on locations brought into contact with each other when the lens unit 110 and the image sensor holder 200 are connected with each other. The electromagnetic force may be generated between the magnet portion 113 of the lens unit 110 and the coil portion 240 of the image sensor holder 200 by the above-described structural characteristics. Accordingly, the lens unit 110 may perform the rotational motion by the electromagnetic force. That is, the lens unit 110 may be driven in the optical axis direction with respect to the movement guide 120. In addition, the lens unit 110 may perform the translational motion with respect to the image sensor holder 200 by the electromagnetic force. Accordingly, on the assumption that the optical axis direction is the z-axis direction, the lens unit 110 may be driven in the x, y, and z-axis directions.

When the lens unit 110 performs the rotational motion by the electromagnetic force, the protrusion 111 included in the lens unit 110 moves along the inclined surface of the inclination part 121 included in the movement guide 120.

Accordingly, a tilt can be reduced while the lens unit 110 is being driven with respect to the movement guide 120.

Figure 7A:
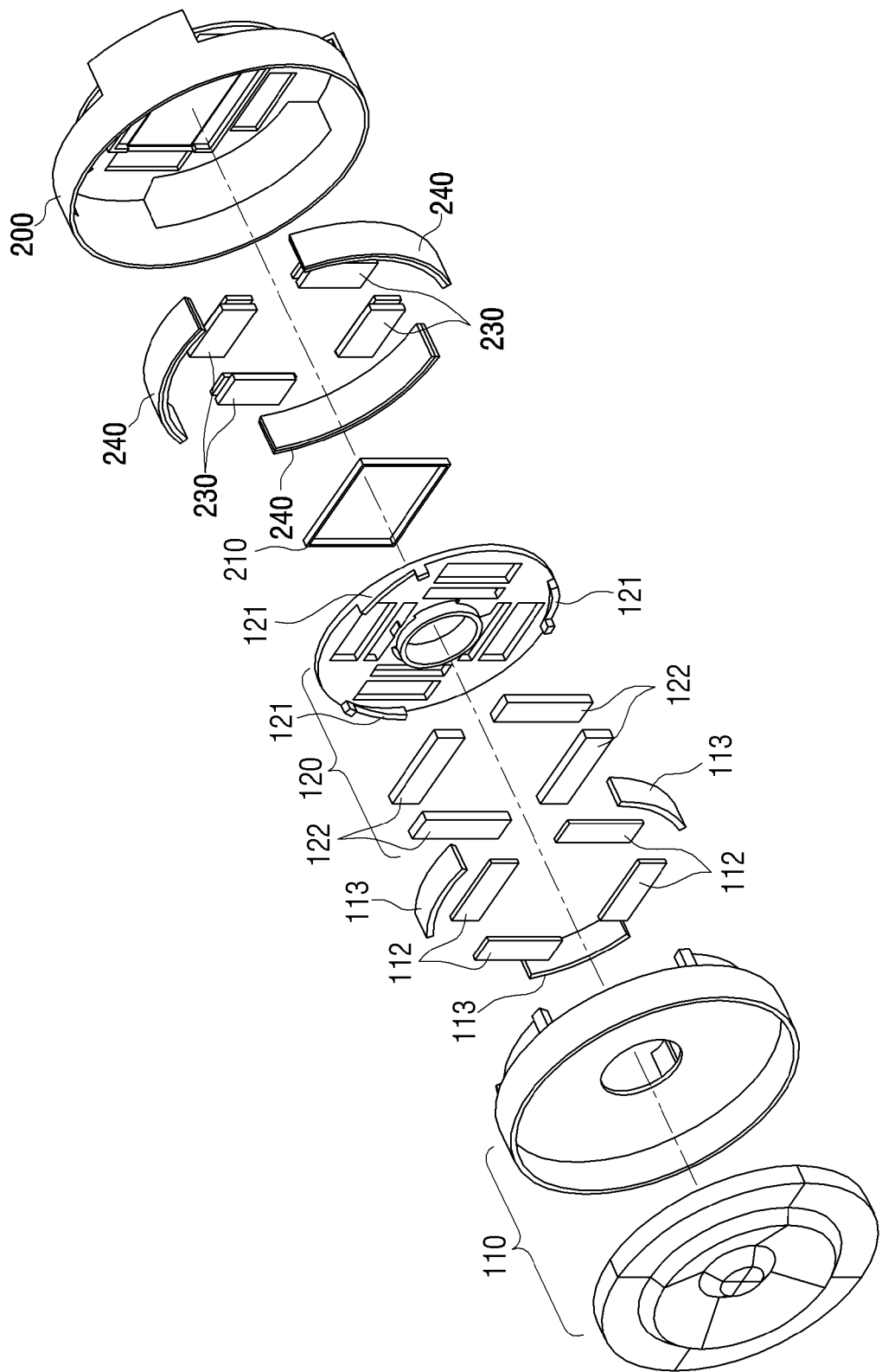
FIGS. 7A and 7B are views showing a configuration of a lens module, according to an exemplary embodiment.
Figure 7B:
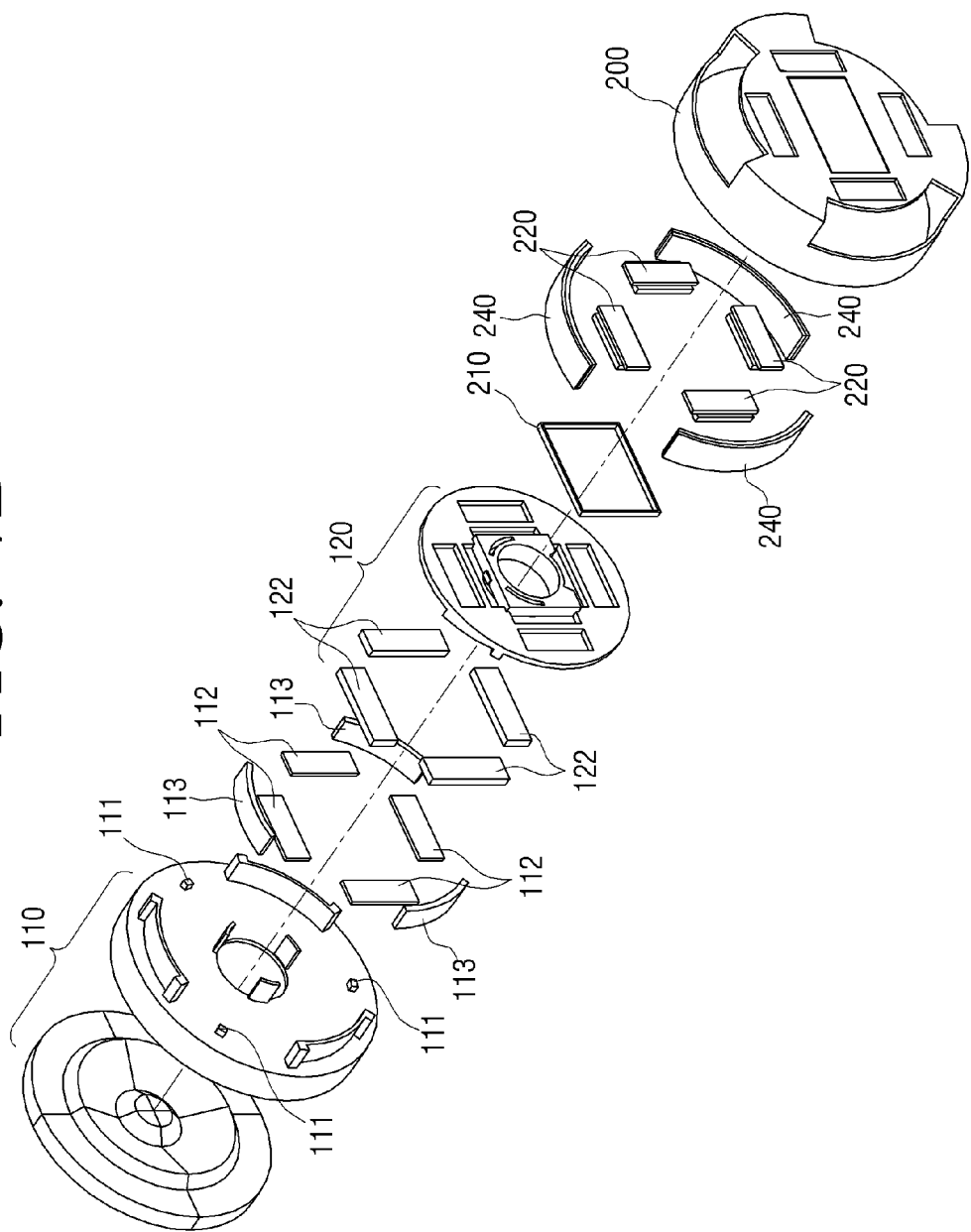

FIGS. 7A and 7B are views showing a configuration of the lens module 100, according to an exemplary embodiment. FIGS. 7A and 7B are exploded perspective views showing the elements of the lens module 100 in different directions.

As shown in FIGS. 7A and 7B, the lens module 100 may include at least one lens, and include the lens unit 110 including a thin lens. The lens unit 110 is movable in the optical axis direction, and may include the at least one protrusion 111.

The lens module 100 includes the yoke portion 112 including a plurality of yokes, i.e., magnetic yokes, as an element included in the lens unit 110. In FIGS. 7A and 7B, the yoke portion 112 includes four yokes, but this is an example and the number of yokes is not limited.

The lens module 100 includes the magnet portion 113 is attachable to the side surface of the cylindrical lens unit 110, as another element included in the lens unit 110. That is, when the lens unit 110 is implemented in a cylindrical shape, the magnet portion 113 may be formed on the side surface of the lens unit 110 in a spaced pattern.

The movement guide 120 may also include at least one lens like the lens unit 110. The movement guide 120 may include a thin lens.

The movement guide 120 includes the magnet portion 122 formed on one surface contacting the lens unit 110 among the plurality of surfaces of the movement guide 120. The magnet portion 122 of the movement guide 120 is disposed on a location to correspond to the yoke portion 112 included in the lens unit 110.

That is, as shown in FIG. 7A, the yoke portion 112 and the magnet portion 122 may be implemented in a similar size, and are disposed to face each other. The yoke portion 112 included in the lens unit 110 and the magnet portion 122 included in the movement guide 120 may be connected with each other by the magnetic force. Accordingly, the lens unit 110 and the movement guide 120 may be subject to pre-load by the magnetic force.

The lens unit 110 and the movement guide 120 being subject to the pre-load by the yoke portion 112 and the magnet portion 122 is an exemplary embodiment. The lens unit 110 and the movement guide 120 may include elements such as a spring instead of the yoke portion 112 and the magnet 122, and thus may be subject to the pre-load.

The image sensor portion 210 is an element including an image sensor. On the assumption that the optical axis direction is the z-axis direction, the image sensor portion 210 is movable in the y-axis direction.

The lens module 100 includes the coil portion 230 formed on a location corresponding to the magnet portion 122 of the movement guide 120. In addition, the lens module 100 includes the yoke portion 220 overlapping with the coil portion 230. In addition to the above-described image sensor portion 210, the yoke portion 220 and the coil portion 230 are included in the image sensor holder 200.

The coil portion 230 is an element for driving the movement guide 120 with respect to the image sensor holder 200. The movement guide 120 may be driven by the electromagnetic force generated between the coil portion 230 and the magnet portion 122 included in the movement guide 120.

For example, when a function, such as a hand shaking prevention function, is performed, the movement guide 120 may perform the translational motion with respect to the image sensor holder 200 by the electromagnetic force generated by the above-described elements. Accordingly, on the assumption that the optical axis direction is the z-axis direction, the movement guide 120 may move in the x and y-axis directions. The coil portion 240 is an element for driving the lens unit 120 in the optical axis direction.

The image sensor holder 200 further includes the coil portion 240 formed on a location corresponding to the location of the magnet portion 113 included in the lens unit 110. That is, the magnet portion 113 of the lens unit 110 and the coil portion 240 of the image sensor holder 200 are disposed on locations to be brought into contact with each other when the lens unit 110 and the image sensor holder 200 are connected with each other.

Accordingly, the electromagnetic force may be generated between the magnet portion 113 of the lens unit 110 and the coil portion 240 of the image sensor holder 200. The lens unit 110 may perform the rotational motion by the electromagnetic force. That is, the lens unit 110 may be driven with respect to the movement guide 120 in the optical axis direction.

In addition, the lens unit 110 may perform the translational motion by the electromagnetic force. Accordingly, on the assumption that the optical axis direction is the z-axis direction, the lens unit 110 may be driven in the x, y and z-axis directions.

When the lens unit 110 performs the rotational motion by the electromagnetic force, the protrusion 111 included in the lens unit 110 moves along the inclined surface of the inclination part 121 included in the movement guide 120. Accordingly, a tilt can be reduced while the lens unit 110 is being driven with respect to the movement guide 120.

Although the lens unit 110 includes the magnet portion 113 and the image sensor holder 200 includes the coil portion 240, this is an exemplary embodiment. The lens unit 110 may include a coil portion and the image sensor holder 200 may include a magnet portion.

The lens unit 110 may further include a magnet of a circular shape formed on one surface contacting the movement guide 120. That is, when the lens unit 110 is driven in the optical axis direction, the movement location of the lens unit 110 is controlled. Accordingly, the lens unit 110 may further include the circular magnet to detect a change in the location of the lens unit 110.

Figure 8:
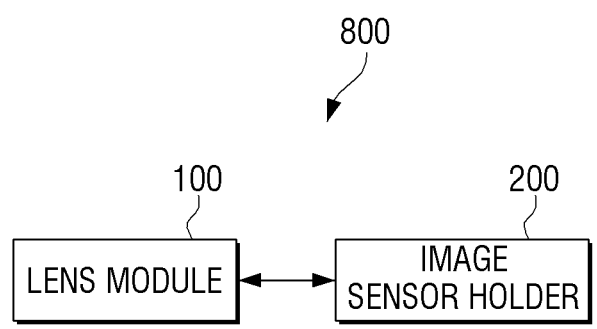
FIG. 8 is a block diagram showing a configuration of a camera, according to an exemplary embodiment.

FIG. 8 is a block diagram showing a configuration of a camera 800, according to an exemplary embodiment. As shown in FIG. 8, the above-described lens module 100 is included in the camera 800. The camera 800 further includes the image sensor holder 200.

Figure 10A:
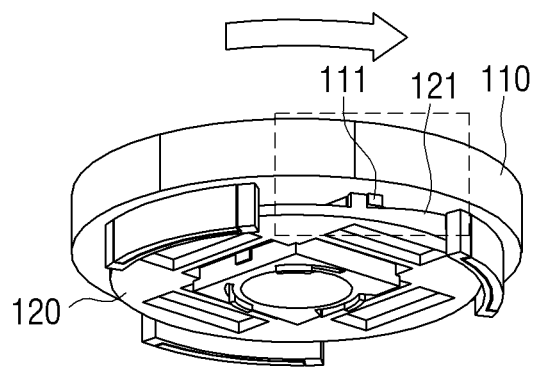
FIGS. 10A, 10B, 10C, and 10D are views showing a lens unit moving in a direction of an optical axis, according to an exemplary embodiment.

FIGS. 10A, 10B, 10C, and 10D are views showing the lens unit 110 moving in the direction of the optical axis, according to an exemplary embodiment. FIG. 10A is a view showing the lens unit 110 that is subject to pre-load with respect to the movement guide 120. That is, as described above, the lens unit 110 and the movement guide 120 may include at least one of a yoke and a magnet, respectively, and are subject to pre-load with respect to each other. The lens unit 110 and the movement guide 120 that are subject to the pre-load have the protrusion 111 of the lens unit 110 and the inclination part 121 of the movement guide 120 that are engaged with each other.

Figure 10B:
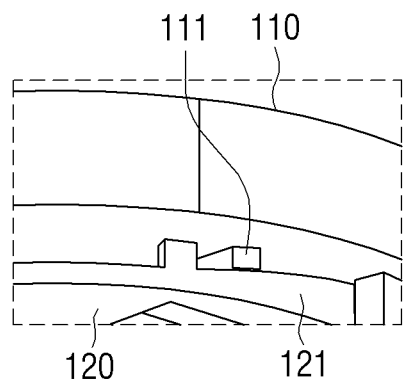
Figure 10C:
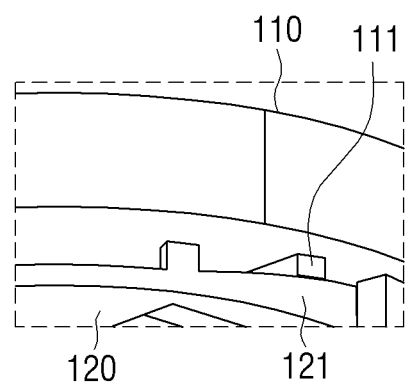
Figure 10D:
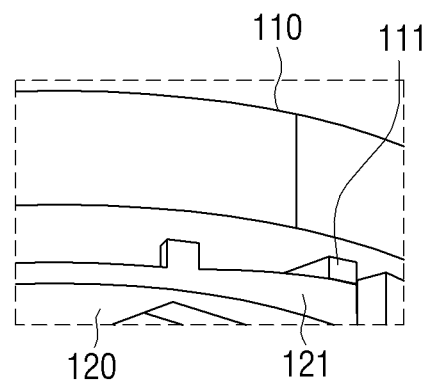

FIGS. 10B to 10D are views enlarging the protrusion 111 included in the lens unit 110 and the inclination part 121 included in the movement guide 120. When a force for driving the lens unit 110 in the optical axis direction is applied, the lens unit 110 performs a spiral motion in the counter clockwise direction, and is driven with respect to the movement guide 120 in the optical axis direction.

When the lens unit 110 is driven with respect to the movement guide 120 in the optical axis direction, the protrusion 111 of the lens unit 110 moves in contact with the inclined surface of the inclination part 121 of the movement guide 120 as shown in FIGS. 10B to 10D.

In the above-described method, the lens unit 110 is driven in the optical axis direction, preventing the tilt. In addition, the above-described driving method may be controlled by a processor included in the camera. For example, the camera may further include a flash memory or other non-volatile memories. The non-volatile memory may store a program for driving the respective elements of the camera.

The processor is an element for controlling the device. The processor may be interchangeably used with the terms such as a central processing device, a micro processor, a controller, etc.

While not restricted thereto, an exemplary embodiment can be embodied as computer-readable code on a computer-readable recording medium. For example, a control program that controls the above-described operations may be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an exemplary embodiment may be written as a computer program transmitted over a computer-readable transmission medium, such as a carrier wave, and received and implemented in general-use or special-purpose digital computers that execute the programs. Moreover, it is understood that in exemplary embodiments, one or more units can include circuitry, a processor, a microprocessor, etc., and may execute a computer program stored in a computer-readable medium.

The foregoing exemplary embodiments and advantages are examples and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A camera comprising:
   a lens module; and
   an image sensor,
   wherein the lens module comprises:
      a lens unit comprising a protrusion, the lens unit being configured to move in a direction of an optical axis of the camera;
      a movement guide comprising an inclination part, the protrusion being configured to slide along the inclination part while the lens unit moves in the direction of the optical axis;
      a driver configured to drive the lens unit in the direction of the optical axis; and
      a pre-loader configured to provide a pre-load between the lens unit and the movement guide in the direction of the optical axis.

2. The camera of claim 1, wherein the pre-loader comprises:
   a first yoke portion disposed on the lens unit; and
   a first magnet portion disposed on the movement guide,
   wherein the pre-loader is configured to provide the pre-load between the lens unit and the movement guide by a magnetic force of the first yoke portion and the first magnet portion.

3. The camera of claim 2, further comprising an image sensor holder comprising the image sensor and a second yoke portion,
   wherein the pre-loader is further configured to provide a pre-load between the movement guide and the image sensor holder by a magnetic force of the first magnet portion and the second yoke portion.

4. The camera of claim 3, wherein the image sensor holder further comprises a first coil portion, and
   the driver is further configured to drive the movement guide to perform a translational motion with respect to the image sensor holder by an electromagnetic force of the first coil portion and the first magnet portion.

5. The camera of claim 4, wherein the lens unit further comprises a second magnet portion,
   the image sensor holder further comprises a second coil portion, and
   the driver is configured to drive the lens unit to perform a rotational motion in the direction of the optical axis by an electromagnetic force of the second coil portion and the second magnet portion.

6. The camera of claim 5, wherein the lens unit further comprises a cylindrical housing comprising a lens,
   the second magnet portion is disposed on a side surface of the cylindrical housing,
   the image sensor holder has a cylindrical shape, and
   the second coil portion is disposed on a side surface of the image sensor holder, the second coil portion being engaged with the second magnet portion, and the image sensor holder being connected with the lens unit.

7. The camera of claim 1, wherein the protrusion is disposed on a surface contacting the movement guide among surfaces of the lens unit, and
   the inclination part is disposed on a surface contacting the lens unit among surfaces of the movement guide.

8. The camera of claim 1, wherein the protrusion is in contact with the inclination part while the lens unit and the movement guide are provided the pre-load and while the lens unit moves in the direction of the optical axis.

9. The camera of claim 1, wherein the lens unit comprises protrusions disposed on a surface contacting the movement guide, among surfaces of the lens unit, at symmetrically spaced units, and
   the movement guide comprises inclination parts disposed on a surface contacting the lens unit, among surfaces of the movement guide, at locations corresponding to locations of the protrusions at symmetrically spaced units.

10. The camera of claim 1, wherein the lens unit is configured to move in the direction of the optical axis to adjust a focal point of the camera while the camera is performing auto focusing.

11. The camera of claim 1, wherein the movement guide comprises a lens, the movement guide being configured to perform a translational motion with respect to the image sensor holder while the camera is performing hand shaking prevention.

12. The camera of claim 1, wherein the lens unit comprises a lens having a ratio of a diameter to a height that is greater than or equal to a value.

13. A lens module comprising:
a lens unit comprising a protrusion and a yoke portion, the lens unit being configured to move in a direction of an optical axis of the lens module; and
a movement guide comprising:
an inclination part, the protrusion being configured to slide along the inclination part while the lens unit moves in the direction of the optical axis; and
a magnet portion connected with the yoke portion.

14. The lens module of claim 13, wherein the inclination part is configured to protrude from a portion of a surface of the movement guide, and has an inclined shape with respect to the surface from which the inclination part protrudes.

15. The lens module of claim 13, wherein the yoke portion comprises yokes disposed on a surface contacting the movement guide among surfaces of the lens unit, and
the magnet portion comprises magnets disposed on a surface opposite to a surface contacting the lens unit among surfaces of the movement guide, the magnets being disposed at locations corresponding to locations of the yokes.

16. A camera comprising:
a lens unit comprising a protrusion and a first yoke portion, the lens unit being configured to move in a direction of an optical axis of the camera; and
a movement guide comprising:
an inclination part, the protrusion being configured to slide along the inclination part while the lens unit moves in the direction of the optical axis; and
a first magnet portion connected with the first yoke portion; and
an image sensor holder comprising:
an image sensor; and
a second yoke portion connected with the first magnet portion.

17. The camera of claim 16, wherein the image sensor holder further comprises a first coil portion connected with the first magnet portion.

18. The camera of claim 17, wherein the lens unit further comprises a second magnet portion, and
the image sensor holder further comprises a second coil portion connected with the second magnet portion.

19. The camera of claim 18, further comprising a driver configured to:
drive the movement guide to perform a translational motion with respect to the image sensor holder by an electromagnetic force of the first coil portion and the first magnet portion; and
drive the lens unit to perform a rotational motion in the direction of the optical axis by an electromagnetic force of the second coil portion and the second magnet portion.

20. The camera of claim 17, wherein the image sensor, the second yoke portion, and the first coil portion are disposed on a surface contacting the movement guide among surfaces of the image sensor holder.

* * * * *